United States Patent
Peterson et al.

(10) Patent No.: US 9,747,769 B2
(45) Date of Patent: Aug. 29, 2017

(54) ENTRY POINT OPENING SENSOR

(71) Applicant: Google Inc., Mountain View, CA (US)

(72) Inventors: Kevin Charles Peterson, San Francisco, CA (US); Sophie Le Guen, Burlingame, CA (US); Yash Modi, San Mateo, CA (US); Julia Deluliis, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/991,108

(22) Filed: Jan. 8, 2016

(65) Prior Publication Data

US 2016/0189511 A1 Jun. 30, 2016

(51) Int. Cl.
| | | |
|---|---|---|
| *G08B 13/24* | (2006.01) |
| *E05B 39/00* | (2006.01) |
| *E05B 47/06* | (2006.01) |
| *G08B 13/08* | (2006.01) |
| *G08B 25/00* | (2006.01) |
| *G07C 9/00* | (2006.01) |
| *G01P 15/00* | (2006.01) |

(52) U.S. Cl.
CPC .......... *G08B 13/2491* (2013.01); *E05B 39/00* (2013.01); *E05B 47/06* (2013.01); *G08B 13/08* (2013.01); *G08B 25/001* (2013.01); *G08B 25/008* (2013.01); *G01P 15/00* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 4,701,669 A | 10/1987 | Head et al. |
| 6,219,140 B1 | 4/2001 | Kaplan |
| 6,263,260 B1 | 7/2001 | Bodmer et al. |
| 6,415,295 B1 | 7/2002 | Feinberg |
| 6,880,957 B2 | 4/2005 | Walters |

(Continued)

FOREIGN PATENT DOCUMENTS

| | | |
|---|---|---|
| DE | 102005018826 B3 | 10/2006 |
| DE | 102008022276 A1 | 11/2009 |

(Continued)

OTHER PUBLICATIONS

International Search Report and the Written Opinion of the International Searching Authority for PCT/US2015/061155 dated Feb. 9, 2016.

(Continued)

*Primary Examiner* — Leon-Viet Nguyen
(74) *Attorney, Agent, or Firm* — Morris & Kamlay LLP

(57) ABSTRACT

A sensor package is disclosed that includes, a compass, an accelerometer, and an electromagnetic flux tag based open/close sensor. The compass may be activated by a microcontroller in response to an indication of movement detected by an accelerometer. The compass's data may be utilized to determine an orientation for the object such as a door on which the sensor package is situated. The orientation data may indicate that the door is ajar and/or that a second magnetic field is present, suggesting tampering. A notice may be dispatched to a controller for the home security system, a client device, a remote system, etc.

33 Claims, 11 Drawing Sheets

(56) References Cited

U.S. PATENT DOCUMENTS

| | | |
|---|---|---|
| 7,403,109 B2 | 7/2008 | Martin |
| 7,608,815 B2 | 10/2009 | Sharma et al. |
| 7,978,069 B2 | 7/2011 | Wu |
| 8,510,255 B2 | 8/2013 | Fadell et al. |
| 8,848,202 B2 | 9/2014 | Dyer et al. |
| 2001/0048030 A1 | 12/2001 | Sharood et al. |
| 2003/0071739 A1 | 4/2003 | Addy et al. |
| 2004/0030531 A1 | 2/2004 | Miller et al. |
| 2004/0032326 A1 | 2/2004 | Nakamura et al. |
| 2006/0181401 A1 | 8/2006 | Martin et al. |
| 2007/0220907 A1 | 9/2007 | Ehlers et al. |
| 2008/0018474 A1 | 1/2008 | Bergman et al. |
| 2008/0094203 A1 | 4/2008 | Kogan et al. |
| 2008/0157964 A1 | 7/2008 | Eskildsen et al. |
| 2009/0102653 A1* | 4/2009 | McGinnis .............. E05B 45/06 340/551 |
| 2009/0140056 A1 | 6/2009 | Leen et al. |
| 2010/0019902 A1* | 1/2010 | Mullet .................. G08B 13/08 340/546 |
| 2010/0127854 A1 | 5/2010 | Helvick et al. |
| 2010/0242368 A1 | 9/2010 | Yulkowski et al. |
| 2010/0289644 A1 | 11/2010 | Slavin et al. |
| 2011/0046805 A1 | 2/2011 | Bedros et al. |
| 2011/0054830 A1* | 3/2011 | Logan .................... G06F 3/011 702/141 |
| 2012/0007713 A1 | 1/2012 | Nasiri et al. |
| 2012/0186774 A1 | 7/2012 | Matsuoka et al. |
| 2013/0024952 A1* | 1/2013 | Sivertsen ............. G08B 13/181 726/34 |
| 2013/0163619 A1 | 6/2013 | Stephanson et al. |
| 2013/0173064 A1 | 7/2013 | Fadell et al. |
| 2013/0245838 A1 | 9/2013 | Zywicki et al. |
| 2013/0257611 A1 | 10/2013 | Lamb et al. |
| 2013/0338839 A1 | 12/2013 | Rogers et al. |
| 2014/0062460 A1 | 3/2014 | Singh et al. |
| 2014/0062466 A1 | 3/2014 | Thibault et al. |
| 2014/0132578 A1 | 5/2014 | Zheng |
| 2014/0191862 A1 | 7/2014 | Haines |
| 2014/0218181 A1 | 8/2014 | Musham et al. |
| 2014/0266669 A1 | 9/2014 | Fadell et al. |
| 2014/0292481 A1 | 10/2014 | Dumas et al. |
| 2014/0313032 A1 | 10/2014 | Sager et al. |
| 2015/0161882 A1* | 6/2015 | Lett ..................... G08B 25/001 340/506 |

FOREIGN PATENT DOCUMENTS

| | | |
|---|---|---|
| EP | 1713045 A2 | 10/2006 |
| EP | 1912180 A2 | 4/2008 |
| WO | 2011141056 A1 | 11/2011 |
| WO | 2014154738 A1 | 10/2014 |

OTHER PUBLICATIONS

International Search Report and Written Opinion dated Feb. 12, 2016 issued in International Application No. PCT/US2015/061157.
Deng, et al., "The Design of Burglar Alarm Circuit Based on the Magnetic Field Sensor", Computing, Measurement, Control and Sensor Network (CMCSN), 2012 International Conference on, IEEE, Jul. 7, 2012, pp. 199-200.
PCT/US2015/067820, International Search Report and Written Opinion issued in PCT/US2015/067820 dated Apr. 6, 2016, Apr. 6, 2016, p. 12.
IPRP dated Jul. 13, 2017 as received in Application No. PCT/US2015/067820.

* cited by examiner

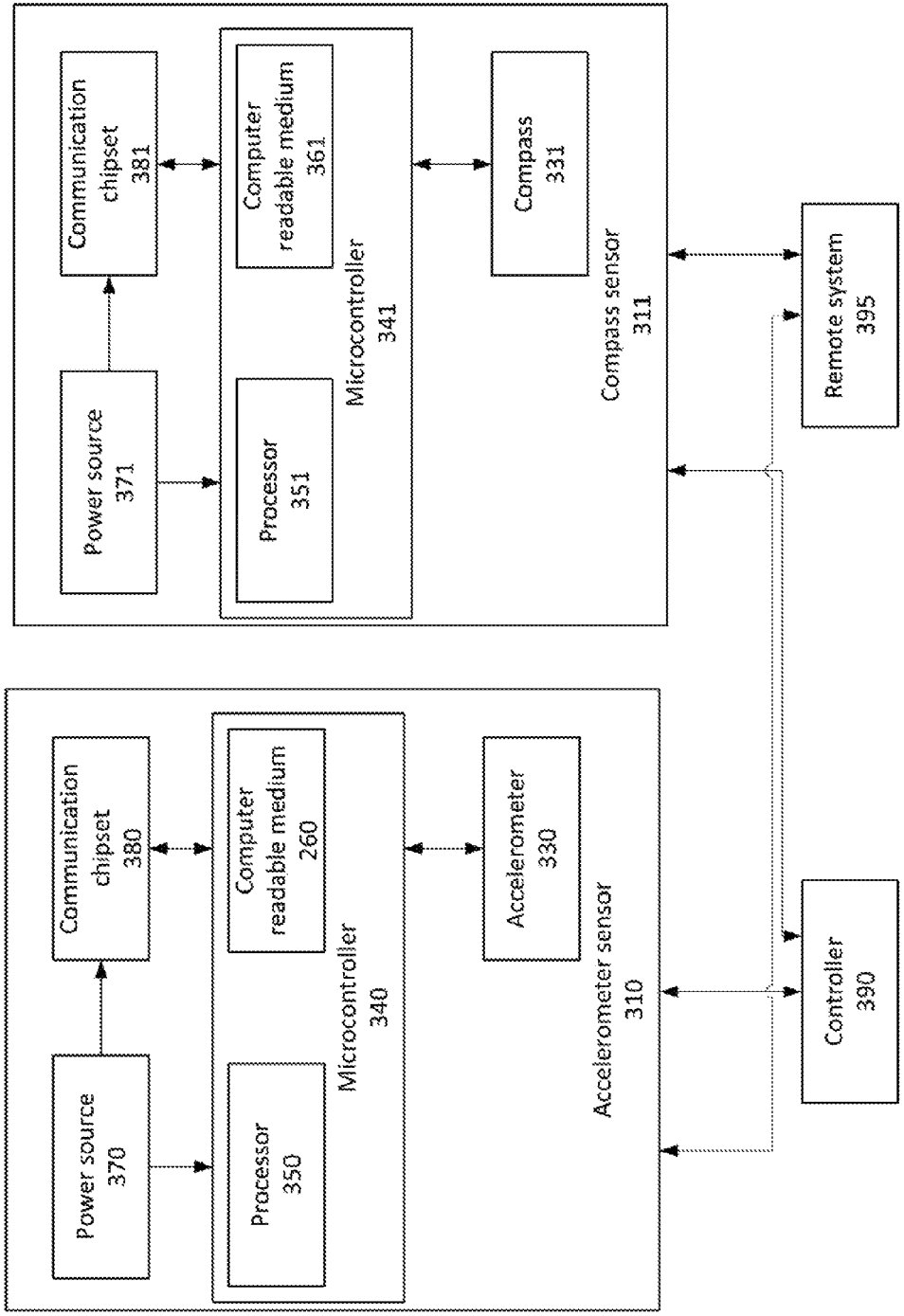

ENTRY POINT OPENING SENSOR

CROSS-REFERENCE TO RELATED APPLICATIONS

This application is a continuation-in-part (CIP) of U.S. application Ser. No. 14/585,222, filed Dec. 30, 2014, the contents of which are hereby incorporated by reference in its entirety.

BACKGROUND

Conventional door and window security systems may utilize a magnet and magnetometer to provide an indication of whether an entry point is open or closed. This binary result may be utilized by a home security system to determine whether it can be placed in an "away" mode or a "home" mode. An "away" mode for the home security system may be utilized, for example, when the occupants are away. In the away mode, the entry points into a home may be monitored for intrusion by an unwanted party. A "home" mode may refer to the home security system's state when the occupants are home. The mode can affect the actions taken by the security system in response to sensed activities in the home. For example, in home mode, the sensed opening of an exterior door may result in no action being taken by the security system. In the away mode, the sensed opening of the same door may be construed as an intrusion detection and may trigger a call to the police. There can also be an intermediate mode between stay and away. For example, there can be a "night" mode for when occupants are sleeping in the home. This mode can, for example, refrain from triggering an alert to the police based on sensed movement in the bedroom and hallways, but send such an alert when an exterior door is opened. The system can transition between modes when a user enters a security code into an entryway security system. Such modes apply to the security system for the whole home.

A home security system that has a home and/or an away state, however, may not detect nuances in usage of entry points and desired security features. For example, if the system determines that a door is open, the security system may not allow an occupant to place the system into an away mode. The system may notify the occupant that it cannot be placed in the away mode because an entry point is open. As an example, an occupant may desire to leave a door or window slightly ajar or open to allow fresh air into the home. To circumvent the home security system, the occupant may place a second magnet in a position that can be detected by the magnetometer when the door or window is open. Thus, the magnetometer may be tricked into thinking that the door or window is closed because it detects the presence of the magnetic field emitted by the magnet. Consequently, the home security system may be placed into an away mode. The placement of a second magnet can also be utilized by an intruder to trick the home security system.

Some other examples of security systems for entry points employing a magnetometer and a magnet include government and bank installations. These examples tend to utilize extremely complex security systems that may utilize balanced read switches that require a specific magnetic field in order to trigger a sensor. The installation of such security systems is very complex, often requiring a multimeter to be connected to the magnetometer to ensure that the sensor is placed in the correct spot.

BRIEF SUMMARY

According to an implementation of the disclosed subject matter, an indication of movement may be received from an accelerometer that is associated with a sensor package. The sensor package may also include a compass and it may be associated with an object having an orientation, such as a door or other movable partition. An activation signal may be sent to the compass. An orientation signal may be received from the compass. A change in the orientation of the object may be determined based upon the orientation signal from the compass.

In an implementation, input may be received from an accelerometer. Input may also be received from a compass. The accelerometer and the compass may be associated with a given object. The accelerometer input and the compass input may be compared to a motion profile for the given object. Based on the comparison, it may be determined that the accelerometer input and/or the compass input are inconsistent with the motion profile. A notice may be generated in response to the determined inconsistency.

A system is disclosed that includes a computer readable storage medium and a processor communicatively coupled thereto. The storage medium may be configured to store data generated by a sensor package that can include one or more of an accelerometer and a compass. The sensor package may be associated with an object that has an orientation. The processor may be configured to receive an indication of movement from the accelerometer. The processor may send an activation signal to the compass and receive an orientation signal therefrom. The processor may be configured to determine a change in the orientation of the object based upon the orientation signal from the compass and/or other sensor data (e.g., data from the accelerometer).

In an implementation, a system according to the presently disclosed subject matter may include a means for receiving an indication of movement from an accelerometer associated with a sensor package. The sensor package may further include a compass and may be associated with an object having an orientation. The system may include a means for sending an activation signal to the compass and a means for receiving orientation signal from the compass. The system may include a means for determining a change in the orientation of the object based upon the orientation signal from the compass and/or other sensor data.

In an implementation, a system according to the presently disclosed subject matter may include a means for receiving input from an accelerometer and a means for receiving input from a compass. The accelerometer and the compass may be associated with a given object. The system may include a means for comparing the accelerometer input and the compass input to a motion profile for the given object. Based on the comparison, the system may include a means for determining that the accelerometer input and/or the compass input are inconsistent with the motion profile. The system may include a means for generating a notice in response to the determined inconsistency.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification.

The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 3 shows an example configuration of the accelerometer sensor and the compass sensor as separate sensors that transmit their data to a remote system and/or a controller as disclosed herein.

DETAILED DESCRIPTION

Figure 1:
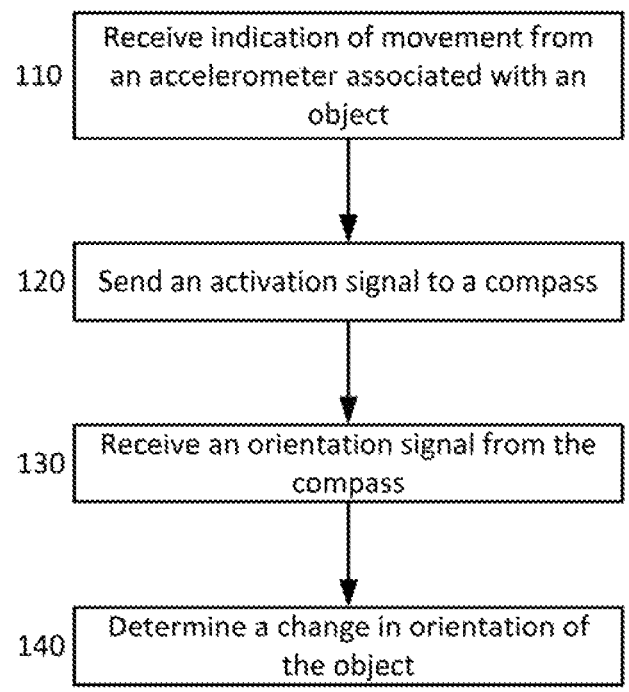
FIG. 1 is an example process for determining the whether a change in the orientation of an object has occurred based on data generated by the compass as disclosed herein.

A compass and/or accelerometer are disclosed as part of a sensor package that may be utilized to determine the amount by which a door or window may be open or ajar as part of an intelligent security system. The compass can provide an indication corresponding to the geomagnetic field and may also provide an indication that a second magnetic field is proximal to the entry point (e.g., a door). For example, the compass may provide analog data that can be received by a processor. The processor may determine that the compass readings are anomalous due to the presence of a second magnetic field as compared to when there was only a single magnetic field. The compass may determine that there's an increase in magnetic field strength and/or that there is an orientation change in the field. For example, the compass may have historically detected a single magnetic field in one spot, but it may now detect the presence of a second magnetic field in a different direction from the first magnetic field. Thus, the compass can determine the orientation or orientation change from a reference point of an object to which it is associated (e.g., a door). While many examples described herein are in the context of a door, other objects may be utilized according to implementations disclosed herein. For example, an implementation can be used in connection with a window that slides between an open state and a closed state. The use of a compass in combination with the accelerometer data may indicate proximity to the closed position and/or the presence of a second magnetic field.

A compass typically requires more power than an accelerometer. In an implementation, an accelerometer can be used to help conserve power used by the sensor package. The compass may be kept in a dormant mode until it receives a request to provide data. In an implementation, a processor may receive data from the accelerometer indicating movement. In response, the processor may send a request for data from the compass, which can then activate into a working mode in which it can gather and send data to the processor. The working mode can be powered by a power supply such as a battery and/or at least partly from energy received in connection with the query from the processor. For example, the compass can receive power from an antenna that receives a query from a remote processor system, much as RFID devices receive and use power from queries. The compass can detect a magnetic field and send data regarding the sensed field to the processor. The processor can compare or otherwise correlate the magnetic field data received from the compass with the movement data received from the accelerometer. Based on the results of the correlation, the processor can assess changes in orientation, the degree of the movement of the door, and/or detect any inconsistencies between the data reported by the compass and the data reported by the accelerometer.

In an implementation, the compass is substantially or always active and does not need a sleep mode, such as when it can draw power from a household electrical system. A system may receive periodic updates from the compass and/or accelerometer with any suitable frequency (e.g., every five seconds). In another implementation, the compass and/or accelerometer can send sensor data only upon detecting a change in a magnetic field or motion, respectively. The reported data can be simply that there has been a change or contain more detail, such as specific information about the particular changes in field or motion detected by these sensors.

Sensor readings may be taken from the accelerometer and/or the compass during an initial set-up and/or when specifically requested to provide a baseline or calibration measurement (see, for example, FIG. 4 and description related thereto below). Further, the compass and/or accelerometer may be controlled by a single microcontroller or individually by a microcontroller (i.e., a microcontroller for the compass and a second microcontroller for the accelerometer). The microcontroller may establish a sampling rule for the accelerometer. For example, it may sample the accelerometer, every five seconds. A sampling may include receiving a signal that is automatically sent from the accelerometer according to the sampling frequency. Another sampling may include sending a query to the accelerometer periodically according to the sampling frequency and then receiving a response corresponding to sensed motion data from the accelerometer. The same regime may be used for the compass. In an implementation, the compass may be activated based on the data generated by the accelerometer.

FIG. 1 is an example process for determining the whether a change in the orientation of an object has occurred based on data generated by the compass. The sensor package with an accelerometer and the compass may be associated with an object having an orientation such as a door, garage door, cabinet door, a refrigerator door, a window, a safe, an object, etc. At 110, an indication of movement from an accelerometer associated with a sensor package may be received. In response, an activation signal may be sent to the compass may be activated at 120. At 130, an orientation signal containing magnetic field data may be received in response to the activation signal. To send the orientation signal, the compass may, in response to receiving the activation signal, transition from a lower energy mode to a higher energy mode and sense the magnetic field. At 140, a processor may determine a change in orientation of the object with which the sensor package is associated.

Figure 2:
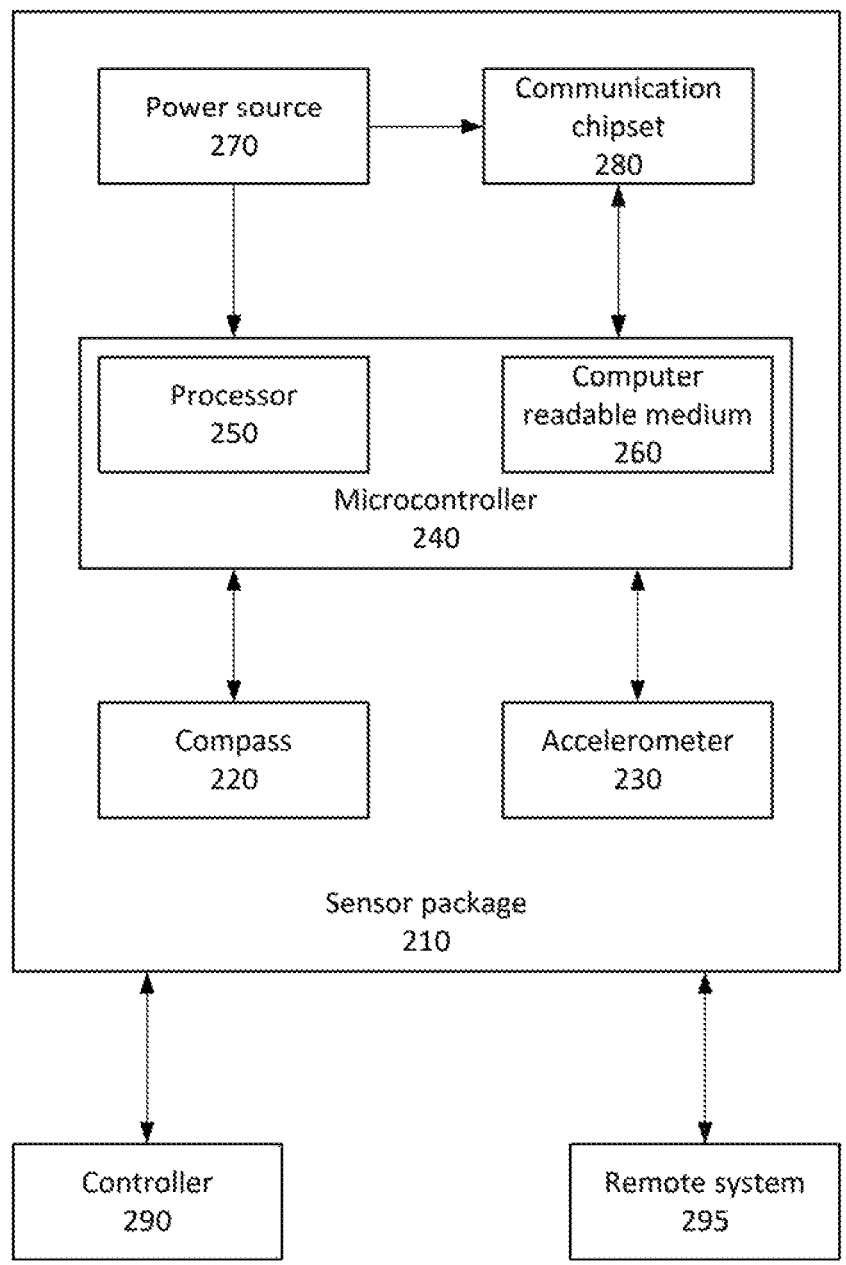
FIG. 2 is an example configuration of the sensor package that includes a microcontroller for both the accelerometer and the compass, a power receiver, and a radio represented by the communication chipset as disclosed herein.

FIG. 2 is an example configuration of the sensor package 210 that includes a microcontroller 240 for the accelerometer 230 and the compass 220, a power source 270, and a transceiver (e.g., using radio or another communications medium) represented by the communication chipset 280. The communication chipset may refer to hardware suitable for wired and/or wireless communications such as an Ethernet connection. The microcontroller 240 may include a processor 250, a computer readable memory 260 that may be programmed with computer readable code. The microcontroller 240 may receive instructions (which may include configuration information and activation signals) from a controller 290 and/or a remote system such as a server or cloud service 295. Similarly, the microcontroller 240 may communicate data generated by the compass 220 and/or accelerometer 230 to the controller 290 and/or the remote system 295 via the communication chipset 280. The sensor package 210 may refer to the compass 220, microcontroller 240, power source 270, and the communication chipset 280 and may be disposed together as a single unit. The sensor package 210 may receive power from any suitable power source 270 (e.g., a lithium battery, an electrical outlet, or a wireless power supply).

In some configurations, the sensor package may include a combination of the accelerometer and the compass, from which data may be processed by the same processing system (e.g., a single processor or collocated processors). FIG. 3 shows an example configuration of the accelerometer sensor 310 and the compass sensor 311 as separate sensors that transmit their data to a controller 390 and/or a remote system 395. The accelerometer sensor 310 may be at least partly controlled by one microcontroller 340 and the compass sensor 311 may be at least partly controlled by a different microcontroller 341. The compass sensor 311 and the accelerometer sensor 310 may be collocated on the object, either proximate to each other (for example, when the sensors are integrated into a single hardware unit) or separated and placed at different locations of the object.

The configuration of the separate sensors 310, 311 may be similar to that shown in FIG. 2. Each sensing system 310 and 311 may have a power source 370, 371, a communication chipset 380, 381, processor 350, 351, computer readable medium 360, 361, and their respective sensors 330, 331 that operate essentially as described in FIG. 2. Both the compass sensor 311 and the accelerometer sensor 310 may send their respective samples to the same controller 390 or remote system (e.g., the data may be stored in a remote database and processed by a cloud service) 395. The controller 390 and/or the remote system 395 may process the data to determine, for example, whether the object has moved and/or if there has been an orientation change associated with the movement. In some implementations, the processor of one sensor such as processor 350 may receive and process data from and/or control the other sensing system, such as 311.

The object with which a sensor system is associated may include a first surface and a second surface. The accelerometer may be collocated on the same surface, either proximate to the compass or separated by some distance therefrom. In an implementation, the accelerometer can be situated on the first surface and the compass may be situated on the second surface. For example, a sensor package including the compass and the accelerometer may be affixed to the inside of a door utilizing a variety of methods (e.g., Velcro, tape, adhesive, fastening mechanism (e.g., a screw, bolt, etc.)). In some configurations, the door may have multiple surfaces and the compass and the accelerometer may be attached to different surfaces of the door. For example, the accelerometer may be attached to the inside surface of the door near the door handle, while the compass may be attached to the same surface near the hinges. This can result in more robust sensor data because the portion of the door near the handle experiences the greatest magnitude of linear motion that the accelerometer can use to generate motion data. Likewise, the portion of the door near the hinges experiences the more purely rotational motion that can be used by the compass to generate orientation data. The compass can also be used to sense the magnetic field generated by one or more magnets and so may be placed anywhere on the door to best do so. For example, the compass can sense its proximity to a magnet fixed to the doorframe, so the compass may be placed on a portion of the door near that magnet. As the door opens, the placement may cause the compass to become more distal to the magnet and sense a weaker magnetic field. As the door closes, the compass may become closer to the magnet and sense a stronger field. An implementation can use sensor data relating to a specific motion (or lack thereof), orientation, change in motion or orientation and rates of change in motion and/or orientation.

Returning to FIG. 1, an activation signal may be sent to the compass at 120. For example, the compass may be activated in response to the motion detected by the accelerometer. In some configurations, the movement detected by the accelerometer may exceed a threshold amount of movement before transmitting the activation signal to the compass. For example, the accelerometer data may indicate an acceleration of 1.5 m/s$^2$. The processor may determine that this value falls below a predetermined 2 m/s$^2$ threshold and therefore may not send an activation signal to the compass. The accelerometer data that indicates motion below a threshold may indicate that a motion is caused by a breeze or a pet. As another example, the accelerometer data may indicate that although a door is not moving rapidly, the movement is constant and/or occurring with a frequency that could indicate an undesirable incursion. For example, the threshold for waking the compass may be 2 m/s$^2$ but it may have an override if the movement below the threshold occurs for more than five seconds. Thus, the threshold can be a duration, an acceleration, a velocity, or a combination thereof. For example, the processor may have a time-based threshold for a minimum acceleration and/or velocity.

The activation signal may be associated with the compass receiving power from a power source such that it may generate orientation data. The microcontroller, such as that depicted in FIGS. 2 and 3, may control when power is provided to the compass and/or accelerometer. Some sensor packages may be configured to power continuously the accelerometer. Others may turn on the accelerometer only when motion is detected from a third sensor, such as a camera or passive IR sensor. In some instances, the sensor package may include an interrupt unit that can be controlled by the microcontroller. The length of time the compass is activated may be configured based on the compass's sample rate. The microcontroller and/or the sensor package may contain suitable hardware to switch power on/off to the compass in response to the movement data generated by the accelerometer, for example, by using a Reed switch, which will be described in further detail below with respect to FIG. 4A, or by using electromagnetic flux based tags, such as near-field communications (NFC) tags, radio frequency identification (RFID) tags, or inductive loop sensors, which will be described in further detail below with respect to FIGS. 4B-4D.

An orientation signal may be received from the compass at 130. The compass may be a digital or analog compass. The orientation signal may refer to the intensity of the magnetic field detected by the compass and/or the direction of the magnetic field near the compass. The magnetic field may be geomagnetic or generated by one or more ferromagnetic objects, such as synthetic magnets. The compass may have a sample rate and the orientation of the compass may be obtained at each sample time point. In some configurations, such as an electronic compass, the compass may report orientation data continuously to the microcontroller during the time the compass receives power from the microcontroller. The microcontroller may cease allowing power to activate the compass upon receiving orientation data and/or a signal from the controller and/or remote system that a sufficient amount of data has been received from the compass to compare to the accelerometer data.

The sensor package may have a configuration process that establishes a reference point useful for determining when the object is in a first position (e.g., door closed) and/or a second reference point for when the object is in a second position (e.g., door maximally opened). The accelerometer may obtain steady-state information regarding the orientation of the object or the accelerometer (e.g., if the accelerometer becomes detached from the object) relative to the first reference point. Similarly, the compass may obtain an orientation of its position on the object relative to the first reference point. If the object subsequently experiences an orientation change, the data generated by the compass and/or the accelerometer subsequent to the orientation change may be used to determine how the object has moved. For example, an accelerometer may collect movement data in three directions (x-, y-, and z-axes). The compass may collect orientation data relative to a magnetic pole (e.g., Earth's magnetic pole) and/or a magnetic field that is near it (e.g., a magnet placed on a doorjamb or window casing). As a part of a configuration/initialization procedure for the sensor package, a user may be asked to calibrate the sensor package by placing an object in a first position (e.g., door closed). The user may, for example, press a button on the sensor package and/or provide instructions via a controller and/or remote system for the sensor package to sample the accelerometer and/or compass data while the object is in the first position. A processor, such as one associated with the controller and/or remote system, may compute the average orientation (e.g., strength and/or direction of the magnetic fields(s) proximal to the compass) based on the compass readings and/or the x, y, z, positions based on the accelerometer. Further, the processor may determine the amount of variation in the orientation data and accelerometer data. It may generate a recommendation for a threshold level of movement and/or automatically set a threshold level of movement detected by the accelerometer before sending an activation signal to the compass.

Returning to FIG. 1, at 140, a change in the orientation of the object may be determined based on the orientation signal from the compass and/or the accelerometer data. The compass may report that the object, for example a door, has changed its orientation relative to a previous reading, a calibrated reference point, and/or relative to the geomagnetic field. The compass data, as described above, may be processed by a processor associated with the sensor package, a controller, and/or a remote system such as a cloud service. The orientation data may confirm the movement data generated by the accelerometer and/or indicate that there has been movement of the door beyond a threshold level. The threshold level can include an orientation value, a displacement value, a time, linear and/or rotational velocity or acceleration values, and the like. The system may be configured to, for example, generate a notice and/or transmit an alarm signal to the controller of a home security system if it detects an orientation change of the object (e.g., a door) greater than 10 degrees from the orientation of the object prior to the detected movement. The thresholds for the accelerometer and/or the compass may be applied if the location in which the object is present is in an away state. For example, a home security system may be configured to generate an alarm if it detects unauthorized access, movement on the interior of a home, etc. if the home security system is in an away state. An away state may further include detection of abnormalities within the home such as unusual temperature readings and/or spikes, HVAC operating for an unusually long time, a refrigerator door being open, etc.

Figure 4A:
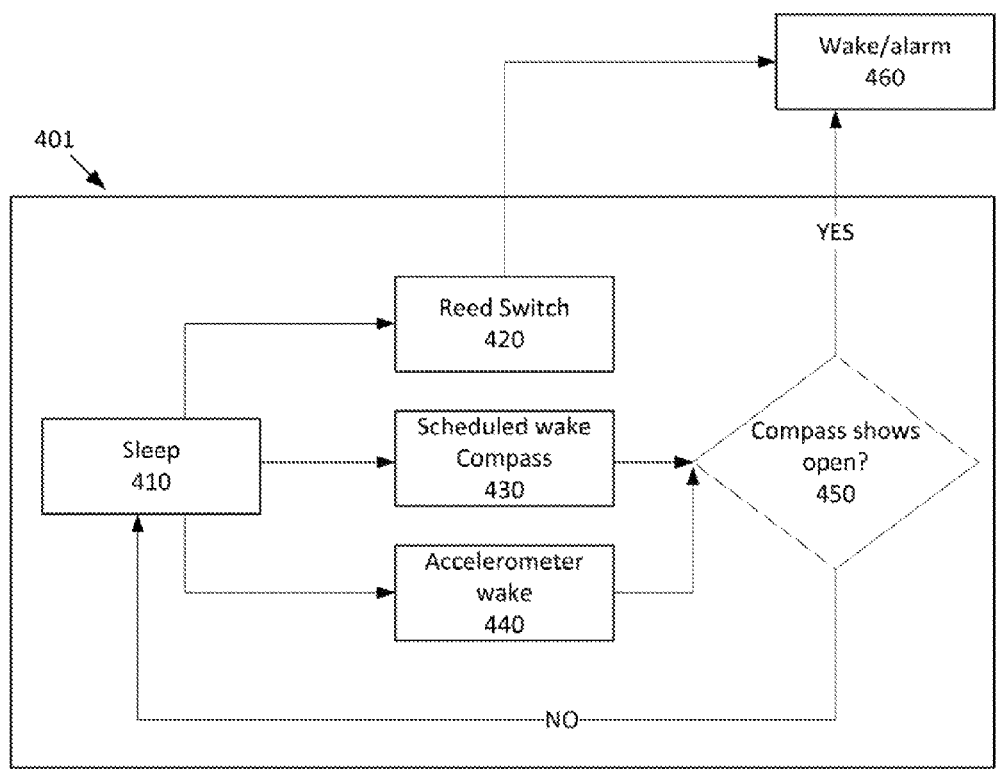
FIG. 4A is an example of the interaction between the accelerometer and the compass as disclosed herein.

FIG. 4A is an example of the interaction between the accelerometer and the compass as disclosed herein. A microcontroller 401 may receive an indication of data generated by an accelerometer. As described above, the accelerometer may detect motion that exceeds a threshold value. That is, movement in one or more of the x-, y-, and/or z-axes may exceed a predetermined value of movement. The compass may ordinarily be deactivated to conserve power as indicated by the sleep mode at 410. It may be awoken at 440 based on the movement detected by the accelerometer. If the compass data at 450 indicates that the door or window, for example, is open, then an alarm or wake instruction 460 may be dispatched by the microcontroller 410. The criteria that need to be met to awaken the compass can be stored as a compass activation threshold. Just as for other thresholds in accordance with implementations, the compass activation threshold can be based on one or a combination of more than one parameters, including position, velocity, acceleration, and duration. It may also be based at least partly on time-of-day and/or data from other sensors.

The compass and accelerometer may be components of a larger security system such as a home security system. The microcontroller may include a Reed switch 420 that, in the presence of a magnetic field, may cause an electrical circuit to be interrupted. The Reed switch 420 may have a sensitivity between 10 to 60 Ampere turns for certain applications. In a typical installation, the sensor package including the compass may be associated with the object such as a door or window and a magnet may be positioned near or on the doorjamb or window casing such that when the door or window is in a closed position, the magnet actuates the Reed switch 420. If the sensor package is a component of a home security system in an away mode and a door with the sensor package is moved away beyond the range of the magnetic field of the magnet, the Reed switch 420 may complete the electrical circuit. The microcontroller 401 may then send a signal to the home security system to awake or dispatch an alarm (e.g., notice) 460. Other types of Reed switches may be utilized such as those in which the electrical circuit is completed in the presence of a magnetic field.

In the sleep state 410, the compass may have a predetermined schedule for sampling 430. For example, the compass may sample orientation data every twenty minutes regardless of other conditions. At 450, the microcontroller may determine, based on the accelerometer data, if the orientation data indicates that an orientation of the object has changed, for example, by comparing the last-sampled orientation data from the compass to a previously stored sample of orientation and/or a reference orientation. The reference orientation may be obtained during calibration of the sensor package. If the compass data indicate that the object, such as a window or door, is in an open position, then the microcontroller may dispatch a notice and/or wake instruction 460 to a security system. If the compass data indicate that the orientation of the object has not changed, then the microcontroller may proceed to 410.

Figure 4B:
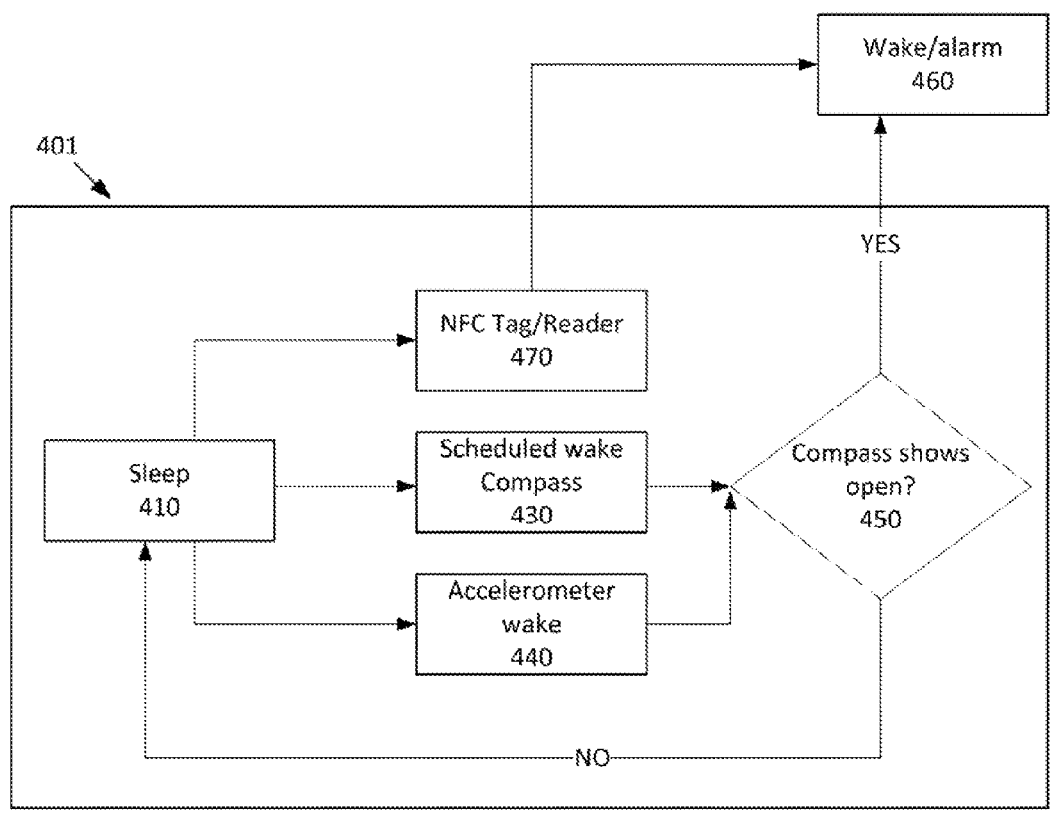
FIG. 4B is an example of the interaction between the accelerometer, the compass and a near field communication (NFC) tag/reader sensor as disclosed herein.

FIG. 4B shows another example of the interaction between the accelerometer and the compass similar to FIG. 4A, except that the magnetically actuated open/close sensor, such as a Reed switch 420 as shown in FIG. 4A, is replaced by a two-part sensor combination including an electromagnetic flux based tag and a reader, such as a near-field communication (NFC) tag/reader sensor 470 in FIG. 4B. In this example, the NFC tag, with its associated reader, may be implemented as an open/close sensor on a door or window, or on another movable part. NFC tags typically have slim form factors, which allow them to be placed within door or window jambs, for example. Due to their slim form factors, NFC tags may be placed in positions that are completely invisible to potential intruders.

In an embodiment, the NFC tag may be placed on an invisible or inconspicuous part of a movable object, such as a window, a door, a casement window, a movable skylight window, a shutter, or a vent opening, for example, whereas the NFC reader may be place at a fixed position, for example, on a window sill, frame, or wall. For example, when the movable object, such as a window, door, etc. moves from a closed position to an open position, the NFC tag moves accordingly from a unreadable to a readable position for the NFC reader to read the NFC tag, thus triggering an indication that the object has moved. The NFC tag/reader sensor 470 may work in conjunction with the compass and/or the accelerometer to detect the change in the orientation of the object, such as a window, door, shutter, etc., and/or the motion caused by the force imparted on that object, as described above with respect to FIG. 4A. In an embodiment, the NFC tag/reader sensor 470 in FIG. 4B may be configured to provide an initial indication that the object has moved, and the compass and/or the accelerometer may provide additional data regarding the orientation and/or the motion of the object due to a force imparted on the object to allow the microcontroller to 401 to determine whether an alarm and/or wake instruction 460 should be generated.

Furthermore, an NFC tag may be able to provide more information than other types of sensors, for example, a simple magnet. In some implementations, the information carried by the NFC tag may allow the NFC reader to verify the tag through a security code, for example. Moreover, NFC tags may be produced in a variety of form factors economically, and NFC readers may consume less power than other types of conventional sensors. Unlike some other types of sensors, the NFC tag/reader sensor may not be sensitive to some types of interferences in the environment. For example, unlike magnetic sensors, the sensing operations of the NFC tag/reader sensor are not affected by the presence of a strong magnetic field.

Figure 4C:
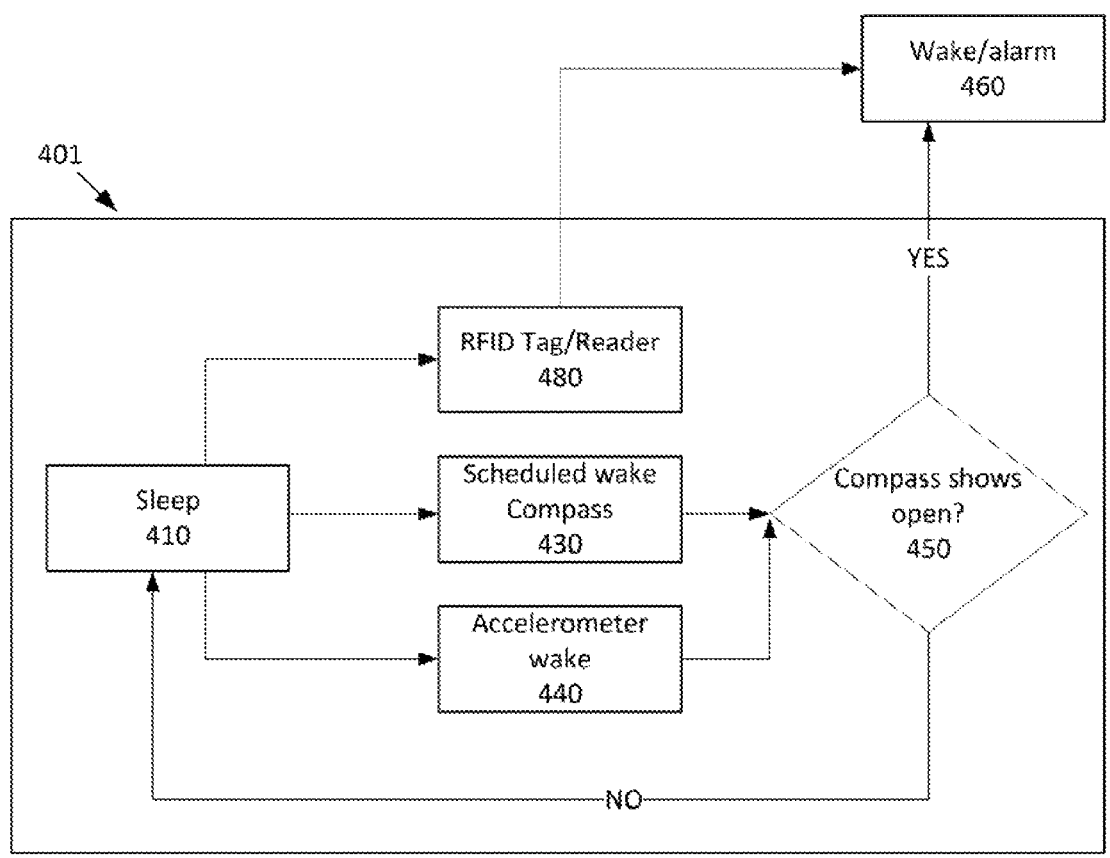
FIG. 4C is an example of the interaction between the accelerometer, the compass and a radio frequency identification (RFID) tag/reader sensor as disclosed herein.
Figure 4D:
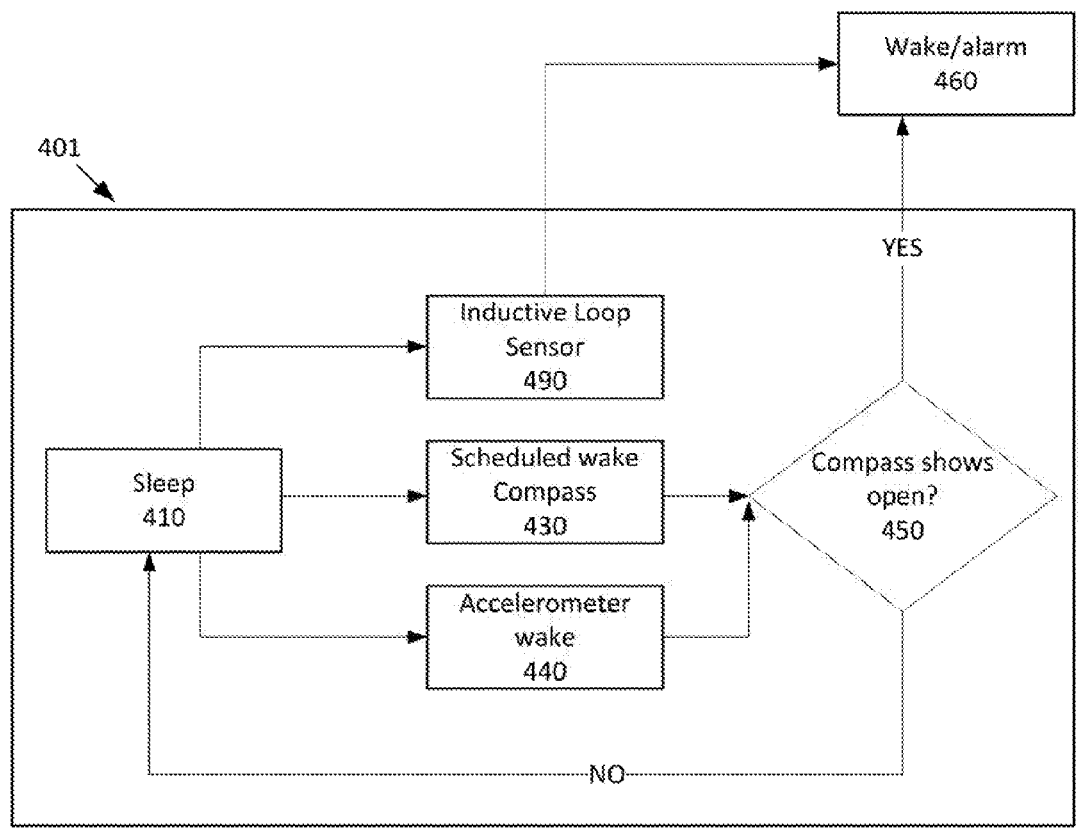
FIG. 4D is an example of the interaction between the accelerometer, the compass and an inductive loop sensor as disclosed herein.

In some configurations, other types of electromagnetic flux based tags, such as radio frequency identification (RFID) tags or inductor loops, may be used as the open/closer sensor. FIG. 4C shows another example of the interaction between the accelerometer and the compass similar to FIG. 4B, except that the NFC tag/reader sensor 470 in FIG. 4B is replaced by a radio frequency identification (RFID) tag/reader sensor 480 in FIG. 4C. The RFID tag/reader sensor 480 may be a two-part sensor that includes an RFID tag and an associated reader. The RFID tag may be a passive tag or an active tag, for example. Microchips for RFID tags may have very small form factors, and may be installed in door or window jambs and thus invisible to potential intruders, for example. FIG. 4D shows another example of the interaction between the accelerometer and the compass similar to FIG. 4C, except that the RFID tag/reader sensor 480 in FIG. 4C is replaced by an inductive loop sensor 490 in FIG. 4D.

In some configurations, in response to the determination that an orientation change has occurred (e.g., the magnetic field is weaker or has otherwise changed, another magnetic field has been detected, and/or no magnetic field is detected), a notice may be generated. The notice may be generated by the microcontroller (e.g., a wake instruction), a controller, and/or a remote system as described herein. The notice may indicate, for example, that the object (e.g., door or window) is open or closed, and/or activate an alarm. The sensor package containing the microcontroller, the compass, and the accelerometer may be components of a home security system in which entry points are observed for anomalies. In the event one of the sensor packages detects movement and an orientation change, a notice may be dispatched by the sensor package to a controller for the home and/or remote system. The controller and/or remote system may be a device through which a user may configure security settings for the home, including how to respond to a potential threat. The notice, in some instances, may be generated by the controller and/or remote system. The notice may be dispatched to a client device, a controller, and/or a remote system associated with the home. For example, a homeowner, during configuration of a home security or smart home system (see description below), may associate a client device and/or an account with the controller and/or a remote system such as a cloud service. More than one client device may be associated therewith (e.g., for other authorized occupants of the home). A cloud service may perform some or all of the functions of the receiving unit as described herein. In some configurations, the client device may be the controller for the smart home or home security system and it may send/receive data generated by the sensor package to or from sensors in the home via the remote system. The controller and remote system are described in detail below with respect to FIGS. 7A-7C.

The notice generated by the system may be sent to one or more client devices. The client device may provide a reset signal to the controller and/or cloud service. For example, the compass data may be utilized to detect an open door. The client device, such as a smartphone, tablet, or personal computer, may receive an indication that the door is open. The notice may include an indication of the location of the door in the house. The user of the client device may provide a response to the notice. For example, the client device may provide a user interface that presents the information about the basis for the alarm (e.g., a door is open, time of the detected event, identity of the door, etc.). It may allow the user to "ignore" the alarm, alert law enforcement, deploy countermeasures (e.g., emit an audio/video alarm, lock interior doors, etc.), or notify a person in the user's contact list. If the user selects one of these options, the system may attempt to authenticate the user. It may require, for example, a device ID from the client device and a user name/password. In the event the user does not provide credentials that match those stored by the controller, cloud service, and/or the microcontroller's memory, the system may not authenticate the user. In the event the user provides matching credentials, the system may respond accordingly to the user's provided response to the notice.

In some configurations, the notice may include a security breach message. For example, it may indicate that there has been an intrusion into a home. It may send the security breach message to a third party, such as a law enforcement group, and indicate the security breach. The security breach message may include, for example, an address or location (e.g., GPS) of the potential threat, a security status, an authorized occupancy status, a telephone number (e.g., of an authorized occupant and/or a contact person), an image, and a video.

Figure 5:
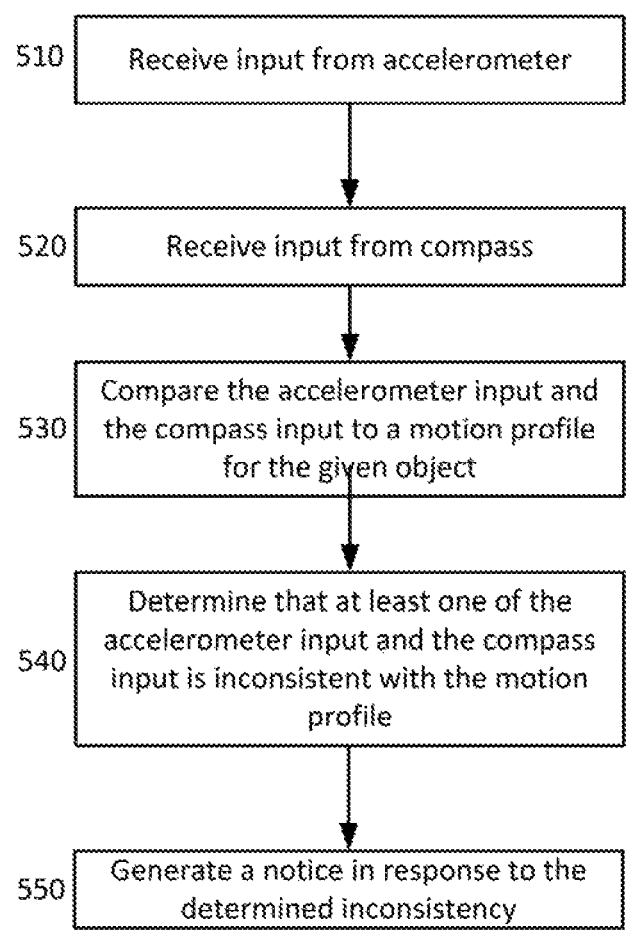
FIG. 5 is an example of a process to generate a notice based on a detected inconsistency.

FIG. 5 is an example of a process to generate a notice based on a detected inconsistency. At 510 and 520, respectively, input from an accelerometer and a compass may be received. The accelerometer and the compass may be associated with a given object (e.g., a door and/or a window). The accelerometer may generate data such as the movement in a particular x-, y-, and/or z-axes as described above and it may be relative to an earlier captured set of coordinates or movement data. The compass may generate orientation data as described above. At 530, the accelerometer input and the compass input may be compared to a motion profile for the given object. For example, as part of a calibration process, the range of motion for the object may be determined. A window or a door may have a range of motion from completely shut to completely open. The user, as part of a calibration sequence for a sensor package that includes the accelerometer and/or compass, may be directed to move the object from one extreme position (e.g., closed) to another extreme position (e.g., closed). Each sensor may generate data during the course of this sequence and the generated data may be referred to as a motion profile for the object. The compass and/or accelerometer input may be compared to the motion profile after it has been generated.

A more complex motion profile may also be used. For example, it is known that most windows generally slide up and down in a vertical plane without rotation. Likewise, hinged doors rotate about a vertical axis. Sensor data can be compared to more complex motion profiles to determine if the motion of the object with which the sensors are associated is consistent or inconsistent (540) with the motion profile. For example, accelerometer data showing motion other than up and down motion may indicate that the window has been broken or that the accelerometer has been removed from the window. Likewise, compass data showing a rotational change in orientation may indicate a problem with a window. Accelerometer and compass data showing a motion that indicates a rotation about a vertical access may indicate a normal opening or closing of a door. On the other hand, door accelerometer data showing motion and compass data showing no rotational change in orientation may indicate that the door has been broken. Notices can be generated based on the comparison of sensor data with motion profiles.

Comparison to motion profiles can also indicate possibility of tampering. For example, it may be determined that the accelerometer data indicate movement of a door to which the sensor package is attached 540. The compass data, however, may not indicate an orientation change. This may suggest that a second magnetic source has been placed near the compass, thereby causing it to register incorrectly the orientation of the door. More specifically, if a second magnet is placed near the door's completely open position such that the compass detects the second magnet's magnetic field in the open position, the displacement of the door may appear greater than the maximum displacement of the door. As another example of an inconsistency, the accelerometer data may indicate the orientation of the door based on its input data compared to a reference (e.g., the motion profile). The compass may register a second orientation change that differs from the first orientation change. For example, the orientation change registered by the compass may be less than that registered by the accelerometer. This may indicate tampering with one of the sensors or that the battery power source is in need of replacement. At 550, a notice may be generated in response to the determined inconsistency. The notice may include, for example, a tamper alert, a door open alert, a door close alert, an alarm, and a reset alert.

An example of a system is disclosed that includes a computer readable medium as shown in FIG. 2. The storage medium may be configured to store data generated by a sensor package that includes an accelerometer as previously described. The sensor package may be associated with an object having an orientation as previously described. A processor may be communicatively coupled to the storage medium as described above. The processor may be configured to receive an indication of movement from the accelerometer and send an activation signal to the compass based thereupon. The processor may receive an orientation signal from the compass and determine a change in the orientation of the object based at least upon the orientation signal from the compass as described earlier.

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the implementations disclosed herein.

Figure 7A:
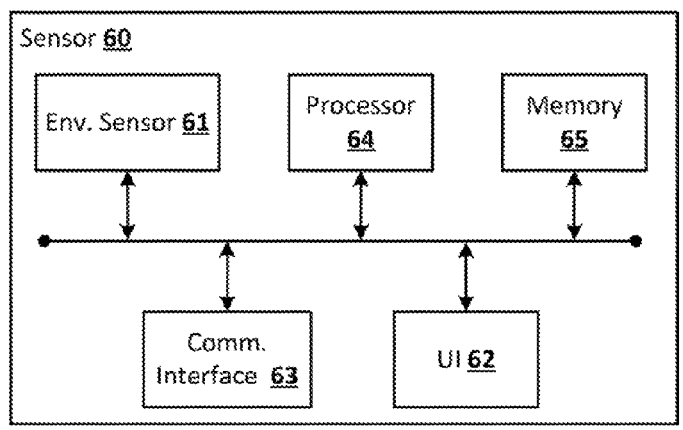
FIG. 7A shows an example sensor as disclosed herein.

A sensor may include hardware in addition to the specific physical sensor that obtains information about the environment. FIG. 7A shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown. As a specific example, a sensor may include a compass and/or an accelerometer as illustrated by FIGS. 2-4 and described in further detail with respect to FIGS. 2-4.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Figure 8A:
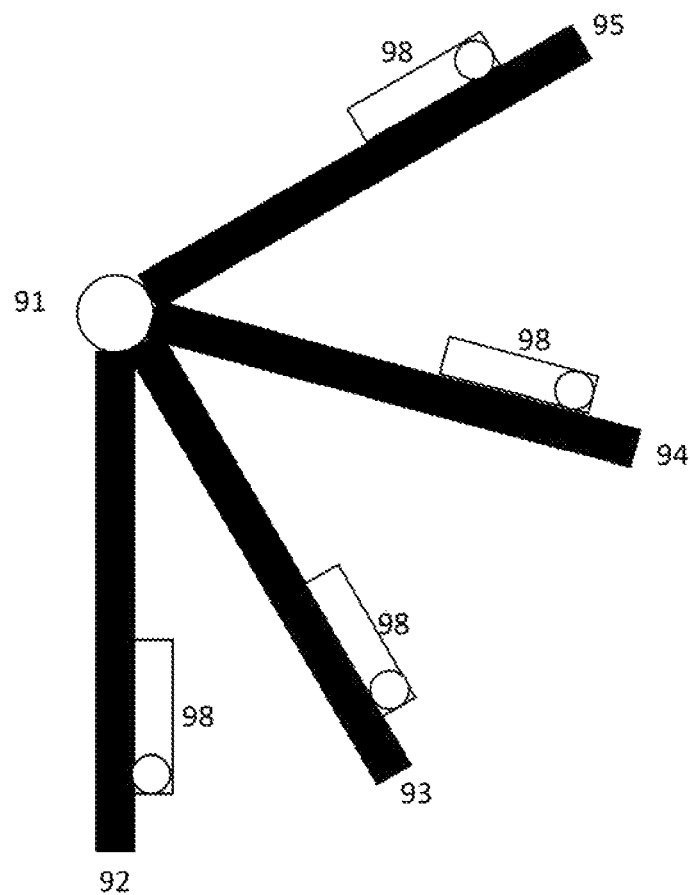
FIG. 8A shows a schematic representation of an example of a door that opens by a hinge mechanism as disclosed herein.

As another example, a security system may employ a magnetometer affixed to a doorjamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the security system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer. FIG. 8A shows a schematic representation of an example of a door that opens by a hinge mechanism 91. In the first position 92, the door is closed and the compass 98 may indicate a first direction. The door may be opened at a variety of positions as shown 93, 94, 95. The fourth position 95 may represent the maximum amount the door can be opened. Based on the compass 98 readings, the position of the door may be determined and/or distinguished more specifically than merely open or closed. In the second position 93, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 8B:
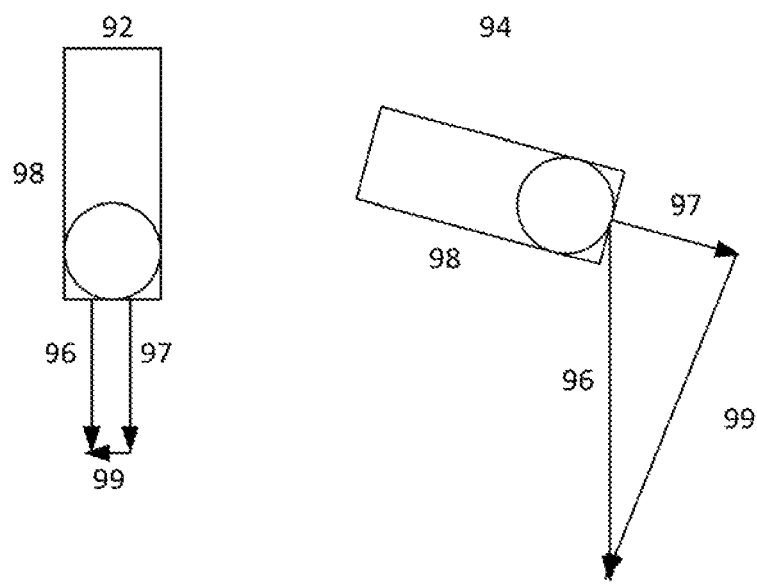
FIG. 8B shows a compass in two different positions that are illustrated in FIG. 8A, according to implementations disclosed herein.

FIG. 8B shows a compass 98 in two different positions, 92, 94, from FIG. 8A. In the first position 92, the compass detects a first direction 96. The compass's direction is indicated as 97 and it may be a known distance from a particular location. For example, when affixed to a door, the compass may automatically determine the distance from the doorjamb or a user may input a distance from the doorjamb. The distance representing how far away from the doorjamb the door is 99 may be computed by a variety of trigonometric formulas. In the first position 92, the door is indicated as not being separate from the doorjamb (i.e., closed) 99. Although features 96 and 97 are shown as distinct in FIG. 8B, they may overlap entirely. In the second position 94, the distance between the doorjamb and the door 99 may indicate that the door has been opened wide enough that a person may enter. Thus, the sensors may be integrated into a home security system, mesh network (e.g., Thread), or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74 as previously described. The data may be analyzed to learn a user behavior, an environment state, and/or as a component of a home security or home automation system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, etc.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some implementations, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7B:
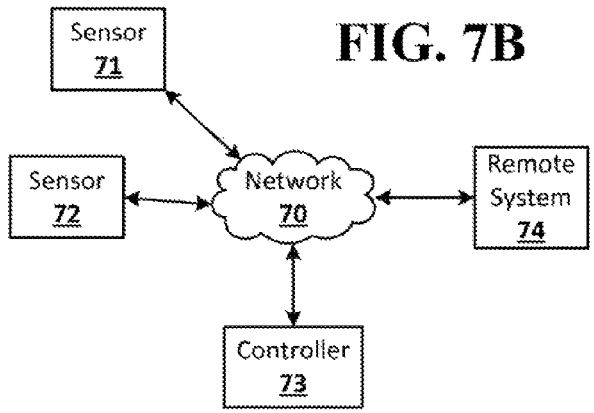
FIG. 7B shows an example of a sensor network as disclosed herein.

FIG. 7B shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail and prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 7B may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7B may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 7B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 7B, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7B, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some implementations, the smart-home environment of the sensor network shown in FIG. 7B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 7B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In implementations of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 7B. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some implementations of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entryways, and the like are closed and/or that all smart entry detectors are in an away mode. In some configurations, such as the door example shown in FIGS. 8A and 8B, the system may arm if it can be determined that the distance the door (or window) is ajar is insubstantial (e.g., the opening is not wide enough for a person to fit through).

The smart-home environment of the sensor network shown in FIG. 7B can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 7B) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some implementations including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 7C:
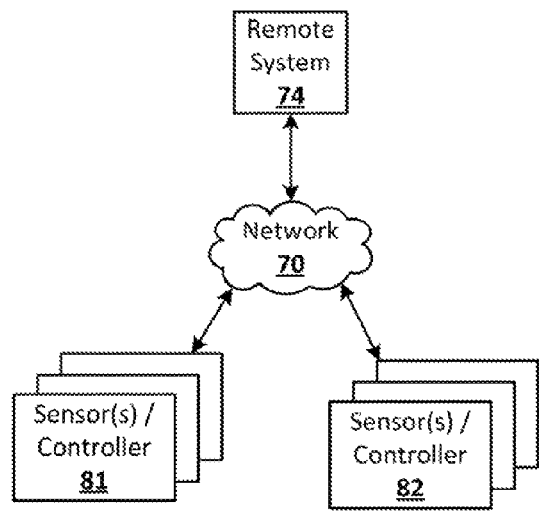
FIG. 7C shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 7B may provide information to the remote system 74 as shown in FIG. 7C. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. As another example, systems disclosed herein may allow a user to restrict the information collected by the systems disclosed herein to applications specific to the user, such as by disabling or limiting the extent to which such information is aggregated or used in analysis with other information from other users. Thus, the user may have control over how information is collected about the user and used by a system as disclosed herein.

Figure 6A:
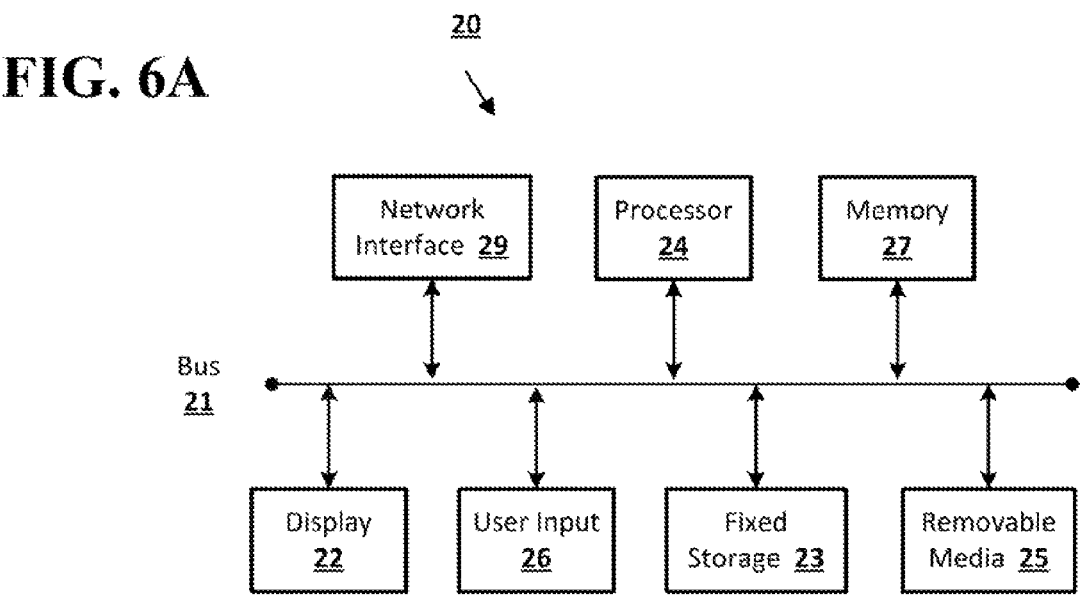
FIG. 6A shows a computer according to an implementation of the disclosed subject matter.

Implementations of the presently disclosed subject matter may be implemented in and used with a variety of component and network architectures. FIG. 6A is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 6B.

Many other devices or components (not shown) may be connected in a similar manner (e.g., document scanners, digital cameras, and so on). Conversely, all of the components shown in FIG. 6A need not be present to practice the present disclosure. The components can be interconnected in different ways from that shown. The operation of a computer such as that shown in FIG. 6A is readily known in the art and is not discussed in detail in this application. Code to implement the present disclosure can be stored in computer-readable storage media such as one or more of the memory 27, fixed storage 23, removable media 25, or on a remote storage location.

Figure 6B:
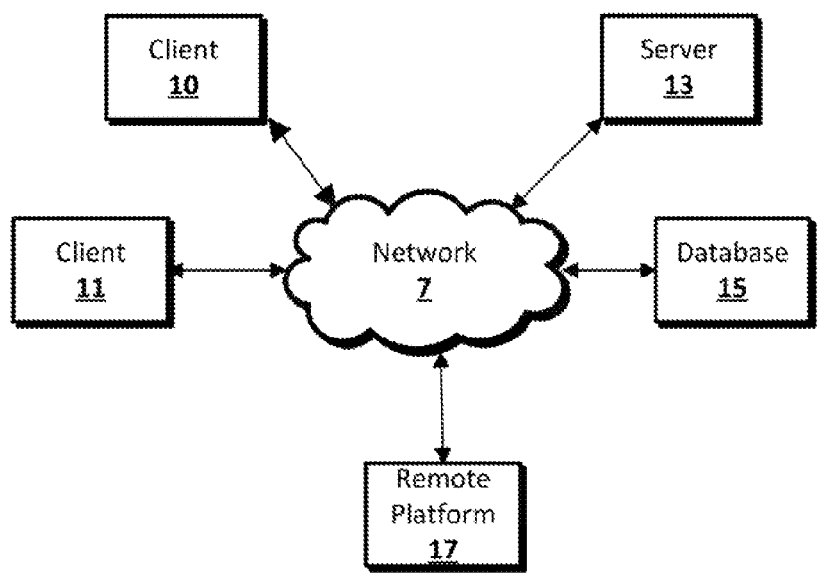
FIG. 6B shows a network configuration according to an implementation of the disclosed subject matter.

FIG. 6B shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving, by a computing device, a first indication from an electromagnetic flux based sensor;
receiving, by the computing device, a second indication from an accelerometer situated on an object, the accelerometer associated with a sensor package further comprising a compass, the sensor package associated with the object, and the object having an orientation;

determining, by the computing device, an inconsistency of the first indication and the second indication with a motion profile, wherein the determined inconsistency indicates a tampering of at least the sensor package by a magnetic source;

sending, by the computing device, an activation signal to the compass in response to the determined inconsistency;

receiving, by the computing device, an orientation signal from the compass; and determining, by the computing device, a change in the orientation of the object based at least upon the orientation signal from the compass.

2. The method of claim 1, wherein the object comprises at least one of a door, a window, a shutter, a skylight, and a vent opening.

3. The method of claim 1, wherein the object has a first surface and a second surface and wherein the accelerometer is situated on the first surface and the compass is situated on the second surface.

4. The method of claim 3, wherein the first surface is the same as the second surface.

5. The method of claim 4, wherein the accelerometer and compass are integrated into a single sensor package.

6. The method of claim 1, further comprising generating a notice in response to the change in the orientation of the object.

7. The method of claim 6, wherein the notice is selected form the group consisting of: a door open alert, a door close alert, an alarm, and a reset alert.

8. The method of claim 6, further comprising receiving, from a client device associated with an authorized occupant, a reset signal in response to the notice.

9. The method of claim 6, further comprising:
authenticating a user; and
receiving from the authenticating user a reset signal in response to the notice.

10. The method of claim 1, further comprising:
generating a security breach message; and
sending the security breach message to a third party, wherein a notice indicates a security breach.

11. The method of claim 10, wherein the security breach message includes at least one from the group of: an address, a security status, an authorized occupancy status, a telephone number, an image, and a video.

12. The method of claim 1, further comprising receiving, by the sensor package, power from a common power source.

13. The method of claim 1, wherein the electromagnetic flux based sensor is selected from the group consisting of:
a sensor comprising a near field communication (NFC) tag and a reader;
a sensor comprising a radio frequency identification (RFID) tag and a reader; and
an inductive loop sensor.

14. A computer-implemented method, comprising:
receiving input from an accelerometer;
receiving input from a compass;
receiving input from an electromagnetic flux based sensor;
wherein the accelerometer, the compass, and the electromagnetic flux based sensor are associated with a given object;
comparing the accelerometer input, the compass input, and the electromagnetic flux based sensor input to accelerometer data, compass data, and electromagnetic flux data stored as a motion profile for the given object;
based on the comparison, determining that at least one of the accelerometer input, the compass input, and the electromagnetic flux based sensor input are inconsistent with the motion profile and that the determined inconsistency indicates a tampering of at least the compass by a magnetic source; and
generating a notice in response to the determined inconsistency.

15. The method of claim 14, wherein the given object is a door attached to a wall with at least one hinge mechanism, wherein the inconsistency comprises accelerometer input that indicates a displacement greater than a maximum displacement of the door about the at least one hinge mechanism.

16. The method of claim 14, wherein the given object comprises a door, further comprising:
determining a first orientation change based on the accelerometer input; and
determining a second orientation change based on the compass input, wherein the second orientation differs from the first orientation.

17. The method of claim 16, wherein the first orientation change is less than the second orientation change.

18. The method of claim 14, wherein the notice is selected from the group consisting of: a tamper alert, a door open alert, a door close alert, an alarm, and a reset alert.

19. The method of claim 14, wherein the electromagnetic flux based sensor is selected from the group consisting of:
a sensor comprising a near field communication (NFC) tag and a reader;
a sensor comprising a radio frequency identification (RFID) tag and a reader; and
an inductive loop sensor.

20. A system, comprising:
a computer-readable storage medium, configured to store data generated by a sensor package comprising at least an accelerometer and a compass, the sensor package associated with an object having an orientation;
a processor communicatively coupled to the storage medium, the processor configured to:
receive a first indication from an electromagnetic flux based sensor;
receive a second indication from the accelerometer;
determine an inconsistency of the first indication and the second indication with a motion profile, wherein the determined inconsistency indicates a tampering of at least the electromagnetic flux based sensor by a magnetic source;
send an activation signal to the compass in response to the determined inconsistency;
receive an orientation signal from the compass;
determine a change in the orientation of the object based at least upon the orientation signal from the compass.

21. The system of claim 20, wherein the object comprises at least one of a door, a window, a shutter, a skylight, and a vent opening.

22. The system of claim 20, wherein the object has a first surface and a second surface and wherein the accelerometer is situated on the first surface and the compass is situated on the second surface.

23. The system of claim 22, wherein the first surface is the same as the second surface.

24. The system of claim 23, wherein the accelerometer and compass are integrated into a single sensor package.

25. The system of claim 20, the processor further configured to generate a notice in response to the change in the orientation of the object.

26. The system of claim 25, wherein the notice is selected form the group consisting of: a door open alert, a door close alert, an alarm, and a reset alert.

27. The system of claim 25, the processor further configured to receive, from a client device associated with an authorized occupant, a reset signal in response to the notice.

28. The system of claim 25, the processor further configured to:
- authenticate a user; and
- receive from the authenticating user a reset signal in response to the notice.

29. The system of claim 20, the processor further configured to:
- generate a security breach message; and
- sending the security breach message to a third party, wherein a notice indicates a security breach.

30. The system of claim 29, wherein the security breach message includes at least one from the group of: an address, a security status, an authorized occupancy status, a telephone number, an image, and a video.

31. The system of claim 20, wherein the sensor package is configured to receive power from a common power source.

32. The system of claim 20, wherein the electromagnetic flux based sensor is selected from the group consisting of:
- a sensor comprising a near field communication (NFC) tag and a reader;
- a sensor comprising a radio frequency identification (RFID) tag and a reader; and
- an inductive loop sensor.

33. The system of claim 20, wherein the first indication comprises an indication of motion of the object and the second indication comprises an indication received in accordance with a sampling frequency of the accelerometer.

* * * * *